(12) United States Patent
Hamperl

(10) Patent No.: US 6,889,802 B2
(45) Date of Patent: May 10, 2005

(54) WHEEL HUB

(75) Inventor: Johann Hamperl, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 66 days.

(21) Appl. No.: 10/318,413

(22) Filed: Dec. 13, 2002

(65) Prior Publication Data

US 2003/0111893 A1 Jun. 19, 2003

(30) Foreign Application Priority Data

Dec. 13, 2001 (DE) .......................... 101 61 206

(51) Int. Cl.[7] .......................... F16D 65/78; B60T 1/06; B60B 27/00
(52) U.S. Cl. .............................. 188/218 XL; 188/70 R; 188/17; 301/105.1
(58) Field of Search .............................. 301/105.1, 137, 301/124.1, 6.7, 6.8; 188/70 R, 17, 18 R, 218 XL, 218 R

(56) References Cited

U.S. PATENT DOCUMENTS 4,811,992 A * 3/1989 Steiner .................... 301/105.1
4,854,423 A * 8/1989 Evans et al. .............. 188/70 R

FOREIGN PATENT DOCUMENTS

DE 19961710 C1 * 2/2001 .......... B60B/27/04

* cited by examiner

Primary Examiner—Xuan Lan Nguyen
(74) Attorney, Agent, or Firm—Crowell & Moring LLP

(57) ABSTRACT

A wheel bearing of a motor vehicle, with a wheel hub arranged rotatably on a transmission axle via at least one pair of rolling bearings and having a flanged surface for at least one running wheel. A brake disc is connected to the wheel hub. The wheel hub is of two-part or multi-part design and a first wheel-hub part is connected to a first rolling bearing and/or to a second rolling bearing and a second wheel-hub part is connected to the brake disc.

7 Claims, 1 Drawing Sheet

WHEEL HUB

This application claims the priority of German Patent Document No. 101 61 206.0, filed Dec. 13, 2001, the disclosure of which is expressly incorporated by reference herein.

BACKGROUND AND SUMMARY OF THE INVENTION

The present invention relates to a wheel bearing of a motor vehicle, with a wheel hub arranged rotatably on a transmission axle via at least one pair of rolling bearings and having a flanged surface for at least one running wheel, and with a brake disc connected to the wheel hub.

There is already a wheel mounting of a driven axle, with a hollow axle body which receives the wheel loads and on the respective outer end of which is seated, fixed axially, at least one rolling bearing carrying a wheel hub with at least one brake disc or brake drum, to which wheel hub is flanged a drive-shaft flange of a drive shaft projecting out of the respective outer end of the hollow axle body, the drive-shaft flange and the wheel hub and also the wheel hub and the flange or flanged region of the brake disc or brake drum having in each case contacting mounting surfaces.

The object on which the present invention is based is to design and arrange a wheel hub in such a way that simple mounting of the brake disc and of the rolling-bearing arrangement is ensured.

The object is achieved, according to the present invention, in that the wheel hub is of two part or multi-part design, a first wheel-hub part being connected to a first rolling bearing and/or to a second rolling bearing and a second wheel-hub part being connected to the brake disc. What is achieved thereby is that, when the brake disc is being changed, there is no need to also remove the bearing arrangement. The brake disc can be demounted together with the second wheel-hub part, while the first wheel-hub part having the bearing arrangement remains on the transmission axle designed as an axle journal. This affords advantages even during the assembly of the wheel bearing, because, for example, the bearing arrangement can be prefabricated, so that later, during line assembly, all that is necessary is a substantially less time-consuming attachment or screwing-on of the second bearing part together with a brake disc. It is also conceivable to screw-connect the brake disc additionally, independently of the wheel hub, in a similar way to motorcycles, so that only the brake disc may be mounted, independently of the wheel hub.

For this purpose, it is advantageous that the brake disc has a flanged part forming an axial bearing surface or a flanged surface and a radial bearing surface and be designed as a cylindrical basic body, the inside diameter of the flanged part and of the brake disc being at least equal to the outside diameter of the first wheel-hub part. This ensures that the brake disc, together with the second bearing part, can be separated from the first bearing part or, during mounting, can be slipped over the first wheel-hub part. The second wheel-hub part is in this case arranged in front of the first wheel-hub part, so that the latter can likewise be drawn off outwards after the release of the screw connection.

According to another embodiment, an additional possibility is that the basic body of the brake disc is formed by the second wheel-hub part and the radial bearing surface is formed by the first wheel-hub part and/or by the second wheel-hub part, the flanged surface of the brake disc being oriented radially to, and the basic body coaxially to, a wheel-bearing center axis. This ensures a simple and rapid production of the flanged surfaces.

Furthermore, it is advantageous that the first wheel-hub part has a flanged surface designed as a radial bearing surface and/or as an axial bearing surface for the second wheel-hub part, the first wheel-hub part being connected to the second wheel-hub part via a screw connection. This likewise ensures simple and rapid manufacture. The screw connection serves at the same time for connecting a drive shaft to the wheel hub.

It is also advantageous, for this purpose, that the first wheel-hub part and/or the second wheel-hub part are/is connected to the brake disc via at least one fixing screw and/or via at least one bolt. The fixing screw serves in this case for the premounting of the second wheel-hub part and the brake disc, so that these can be connected as a structural unit to the first wheel-hub part. A sufficient fastening of the brake disc to the second or else the first wheel-hub part is afforded by the bolt connection for the running-wheel connection.

Finally, according to a preferred embodiment of the present invention, there is provision for there to be provided at the outer end of the transmission axle an axle flange of a drive shaft, the axle flange being designed as a shaft flange and being connected to the first wheel-hub part and/or to the second wheel-hub part via the screw connection of the two wheel-hub parts. Both wheel-hub parts are thus connected to the drive flange simultaneously via only one screw connection.

It is particularly important for the present invention that the first and the second rolling bearing are connected at the outer end of the transmission axle to a prestressing element designed as an axle nut or are prestressed by the prestressing element. The bearing prestress of the rolling-bearing arrangement can thus be determined independently of the mounting of the brake disc.

It is also advantageous that the brake disc has a further radial bearing surface and/or a parking brake together with the axle journal, the ratio of the distances in the axial direction from an axial bearing surface to a brake-disc surface and from the axial bearing surface to the parking brake being between 2:1 and 10:1. The brake disc surface is consequently arranged so as to be offset to the rear with respect to its fastening flange and is connected in one piece to the fastening flange via a flanged part. In addition to the possibility of being able to arrange a parking brake within this flanged part, the cylindrical basic-body surface affords an additional cooling surface for the brake disc.

In connection with the design and arrangement according to the present invention, it is advantageous that the individual bolts of the screw connection are arranged on a part-circle of the size of the mean circumference of the wheel hub. The screw connection connects both wheel-hub parts and by virtue of its rotationally-symmetrical arrangement can be handled simply and quickly.

Moreover, it is advantageous that, after the release of the bolting connection for the rim, the running wheel or the rim is separated from the hub and, after the release of the screw connection of the shaft flange, the drive shaft, together with the second wheel-hub part and the brake disc, is separated from the remaining part of the wheel bearing or of the first wheel-hub part. In this case, it is advantageous that, after the release of the fixing screws, the brake disc is separated from the second wheel-hub part and, after the exchange of the brake disc, the latter is reconnected to the second wheel-hub part by the fixing screws. The two parts are slipped onto the wheel bearing or the first wheel-hub part and are connected to this and to the drive shaft by the screw connection. Only then is the running wheel, together with the brake disc, fastened via the bolt connection.

Other objects, advantages and novel features of the present invention will become apparent from the following detailed description of the invention when considered in conjunction with the accompanying drawings.

DETAILED DESCRIPTION OF THE DRAWINGS

Figure 1:
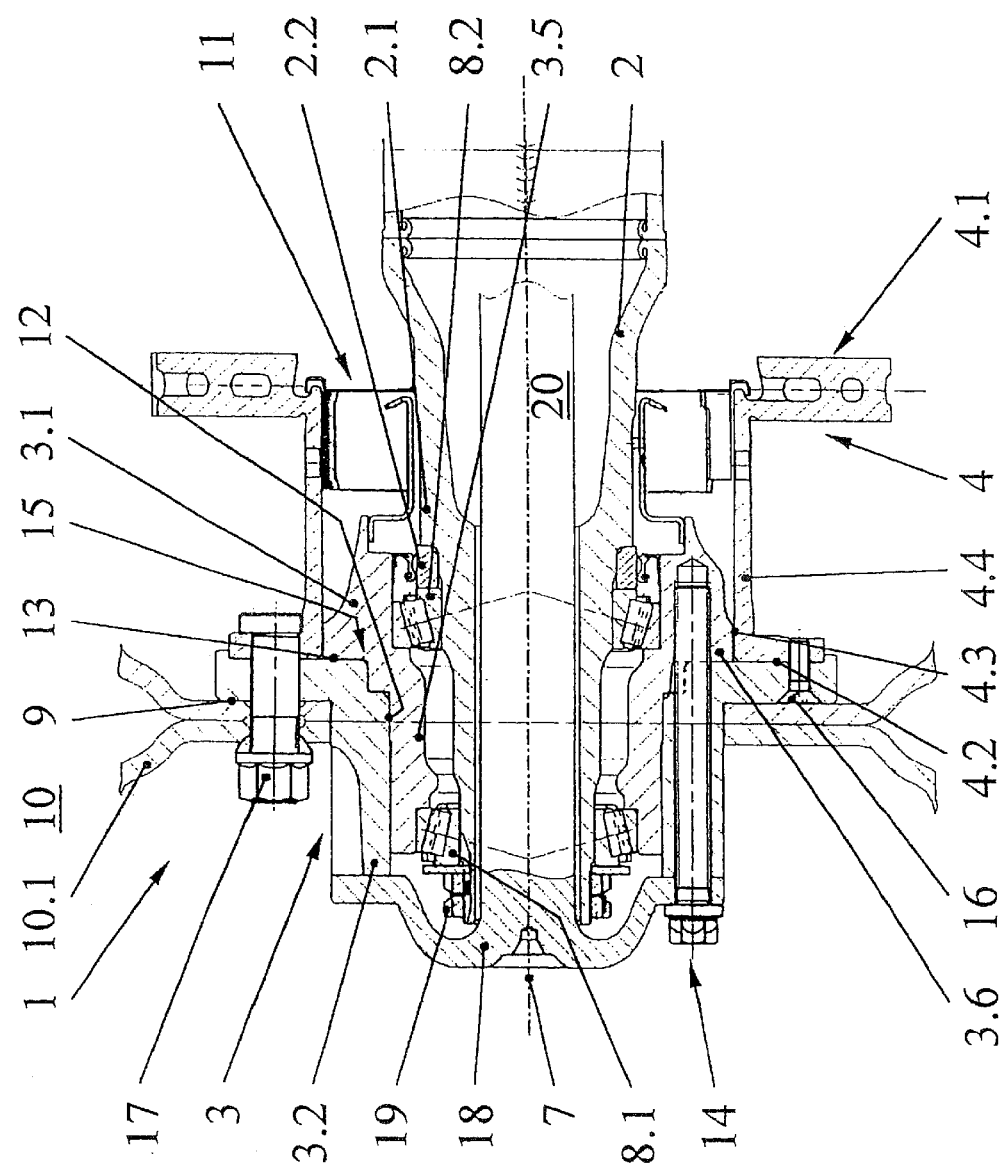
FIG. 1 is a sectional view of a wheel bearing with a two-part wheel hub and brake disc in accordance with an embodiment of the present invention.

FIG. 1 illustrates a wheel bearing 1 for a running wheel 10 mounted rotatably on a transmission axle 2 designed as an axle journal.

Arranged on the stepped axle journal 2 are a first and a second rolling bearing 8.1, 8.2 which are prestressed via an axle nut 19 arranged at the outer end of the axle journal 2. The axle journal 2 has, for this purpose, an outer shoulder 2.1, against which the second rolling bearing 8.2 or its bearing inner ring comes to bear via a spacer ring 2.2.

The axle journal 2 is designed as a hollow profile and on its right-hand side (according to FIG. 1) adjoins an axle receptacle, not illustrated. Within the axle journal 2 is arranged a coaxial inner shaft 20 which is designed as a drive shaft and which is connected to a wheel hub 3 via an axle flange 18 designed as a shaft flange.

Arranged rotatably on the axle journal 2 is a first wheel-hub part 3.1 which is supported on the axle journal 2 via the pair of rolling bearings. For this purpose, the first wheel-hub part 3.1 has an inner shoulder 3.5, against which in each case one of the two rolling bearings 8.1 and 8.2, or their respective bearing outer ring, comes to bear.

The first wheel-hub part 3.1 has outwardly a flanged surface 15 which serves for receiving a second wheel-hub part 3.2. The flanged surface 15 consists of two surface portions which run parallel to a wheel-bearing center axis 7 and which form a radial bearing surface 12 and of two surface portions which run perpendicularly to the wheel-bearing center axis 7 and which form an axial bearing surface 13 for the second wheel-hub part 3.2.

The first wheel-hub part 3.1 and the second wheel-hub part 3.2 are connected releasably via a screw connection 14 arranged on a circle of holes, the axle flange 18 also being connected to the first wheel-hub part 3.1 and the second wheel-hub part 3.2 by the same screw connection 14.

The second wheel-hub part 3.2 has, in addition to the flanged surface 15 matching the first wheel-hub part 3.1, a flanged surface 9 for the wheel tire 10 or its rim 10.1 and a second flanged surface for a flanged surface 4.2 of the brake disc 4. In this case, the rim 10.1, the second wheel-hub part 3.2 and the flanged surface 4.2 of the brake disc 4 are screwed together releasably via a bolt connection 17.

The brake disc 4 has, in addition to its actual brake-disc surface 4.1 provided with cooling bores, a cylindrical flanged part designed as a basic body 4.4, with the flanged surface thereof serving as an axial bearing surface 4.2 and with an inside or outside thereof serving as a radial bearing surface 4.3. The flanged surface relative to the second wheel-hub part is provided at the end of the cylindrical basic body 4.4. The outside and inside of the cylindrical basic body 4.4 in this case form, at least in the region of the flanged surface 4.2, the radial bearing together with the first and second wheel-hub parts 3.1, 3.2. The inner or outer face serving as a radial bearing surface is arranged perpendicularly to the flanged surface 4.2 and directly adjoins the latter.

The flanged surface 4.2 is connected to the second wheel-hub part 3.2 and the rim 10.1 via the bolt 17. The flanged part 4.4 is fixed in the radial direction via an outer shoulder 3.6 of the first wheel-hub part 3.1 and via the flanged surface or an outer edge of the second wheel-hub part 3.2.

Between the brake disc 4 and the axle journal 2 is provided a parking brake 11 which is mounted on the axle journal 2 and which by an actuating device, not illustrated, generates a non-positive or frictional connection with the inner surface of the brake disc 4 or the basic body 4.4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wheel bearing of a motor vehicle, with a wheel hub arranged rotatably on a transmission axle via at least one pair of rolling bearings and having a flanged surface for at least one running wheel, and with a brake disc connected to the wheel hub, wherein the wheel hub is of a two-part design with a first wheel-hub part connected to at least one of a first rolling bearing and to a second rolling bearing, and a second wheel-hub part connected to the brake disc, the brake disc has a cylindrical basic body forming a radial bearing surface and an axial bearing surface designed as a flanged part, and an inside diameter of the basic body and an inside diameter of the brake disc are each at least equals to an outside diameter of the first wheel-hub part, and the axial bearing surface of the brake disc abuts an axial bearing surface of the second wheel-hub part, and the brake disc radial bearing surface abuts a radial bearing surface of the first wheel-hub part.

2. The wheel bearing according to claim 1, wherein the first wheel-hub part has a flanged surface designed as at least one of a radial bearing surface and an axial bearing surface for the second wheel-hub part, the first wheel-hub part being connected releasably to the second wheel-hub part via at least one connection member.

3. The wheel bearing according to claim 1, wherein at least one of the first wheel-hub part and the second wheel-hub part is connected to the brake disc via at least one of a fixing element and a holding element.

4. The wheel bearing according to claim 1, wherein an axle flange of a drive shaft is connected to at least one of the first wheel-hub part and the second wheel-hub part via a connection member.

5. The wheel bearing according to claim 1, wherein the rolling bearings have a prestressing element designed as an axle nut.

6. The wheel bearing according to claim 1, wherein the brake disc has a second radial bearing surface corresponding to a parking brake mounted on an axle journal of the transmission axle, and further wherein a ratio of a distance from the axial bearing surface to a brake-disc surface and a distance from the axial bearing surface to the parking brake in an axial direction being between 2:1 and 10:1.

7. The wheel bearing according to claim 2, wherein the first wheel-hub part and the second wheel-hub part are connected releasbly via a plurality of connection members, the connection members are individual bolts arranged in a circular pattern on the wheel hub, and wherein said circular pattern of connection bolts has an outer diameter which is smaller than an inner diameter of the brake disc.

* * * * *